(12) United States Patent
Bernhardt et al.

(10) Patent No.: US 11,688,252 B2
(45) Date of Patent: Jun. 27, 2023

(54) METHOD OF REMOTE RECONCILIATION OF DATA FROM AN INTELLIGENT CASH HOLDING UNIT AND APPARATUS FOR USE IN SUCH A METHOD

(71) Applicant: Tellermate Limited, Newport Gwent (GB)

(72) Inventors: Mark Bernhardt, Farnham Hampshire (GB); Gareth Jones, Newport Gwent (GB)

(73) Assignee: Tellermate Limited, Newport Gwent (GB)

(*) Notice: Subject to any disclaimer, the term of this patent is extended or adjusted under 35 U.S.C. 154(b) by 897 days.

(21) Appl. No.: 16/462,494

(22) PCT Filed: Nov. 21, 2017

(86) PCT No.: PCT/GB2017/053495
§ 371 (c)(1),
(2) Date: May 20, 2019

(87) PCT Pub. No.: WO2018/100336
PCT Pub. Date: Jun. 7, 2018

(65) Prior Publication Data
US 2019/0272716 A1   Sep. 5, 2019

(30) Foreign Application Priority Data
Dec. 2, 2016 (GB) ..................... 1620478

(51) Int. Cl.
*G06Q 20/20* (2012.01)
*G07G 1/00* (2006.01)
(Continued)

(52) U.S. Cl.
CPC .......... *G07G 1/0027* (2013.01); *G06Q 20/20* (2013.01); *G06Q 20/202* (2013.01); *G07D 11/50* (2019.01);
(Continued)

(58) Field of Classification Search
CPC ............. G07D 11/009; G07D 11/0096; G07D 11/108; G07D 11/125; G07D 11/23;
(Continued)

(56) References Cited

U.S. PATENT DOCUMENTS 4,070,564 A   1/1978   Tucker
4,495,627 A   1/1985   Nishimura
(Continued)

FOREIGN PATENT DOCUMENTS

EP   0281106 A2   9/1988
EP   0724242 A2   7/1996
(Continued)

OTHER PUBLICATIONS

Search Report and Application No. EP0724242, dated Nov. 17, 1999.
(Continued)

*Primary Examiner* — Thien M Le
*Assistant Examiner* — April A Taylor
(74) *Attorney, Agent, or Firm* — Gerald T. Gray; Leydig, Voit & Mayer, Ltd.

(57) ABSTRACT

A method is provided for of operating an intelligent cash holding unit in communication with a remote management terminal via a Wide Area Network (WAN) or Internet Area Network (IAN). The method comprises determining an indication of the cash held in the cash holding unit; transmitting the indication of the cash held in the cash holding unit to the remote management terminal; storing indications of the cash held in the intelligent cash holding unit that are
(Continued)

transmitted to the remote management terminal; and in response to receiving a request signal to transmit one or more stored indications transmitting or re-transmitting one or more stored indications to the remote management terminal. An intelligent cash holding unit is also provided, which is operable to carry out the method, retransmitting lost data in response to the request signal. A method of determining when data is lost and requesting that missing data is also provided, as is a remote terminal operable to carry out the method.

16 Claims, 5 Drawing Sheets

(51) Int. Cl.
  *G07D 11/50* (2019.01)
  *G07G 1/14* (2006.01)
  *H04L 12/28* (2006.01)
  *G07G 1/12* (2006.01)

(52) U.S. Cl.
  CPC ............... *G07G 1/12* (2013.01); *G07G 1/14* (2013.01); *H04L 12/28* (2013.01)

(58) Field of Classification Search
  CPC ...... G07D 11/245; G07D 11/30; G07D 11/32; G07D 11/34; G07D 11/50; G06Q 20/108
  See application file for complete search history.

(56) References Cited

U.S. PATENT DOCUMENTS

| | | | |
|---|---|---|---|
| 4,522,275 A | 6/1985 | Anderson | |
| 4,607,335 A | 8/1986 | Mizuno | |
| 5,813,510 A | 9/1998 | Rademacher | |
| 6,067,530 A | 5/2000 | Brooks, Jr. et al. | |
| 7,850,076 B1 | 12/2010 | Dorenbaum | |
| 8,141,772 B1 | 3/2012 | Folk et al. | |
| 2002/0111157 A1 | 8/2002 | Stieber et al. | |
| 2003/0135406 A1 | 7/2003 | Rowe | |
| 2005/0283403 A1 | 12/2005 | Ramirez et al. | |
| 2006/0253349 A1* | 11/2006 | Brooks, Jr. | G07G 1/12 705/30 |
| 2011/0172960 A1* | 7/2011 | St. George | G07G 1/0018 709/224 |
| 2012/0233006 A1 | 9/2012 | St. George et al. | |
| 2013/0072115 A1 | 3/2013 | Dobyns | |
| 2014/0058856 A1 | 2/2014 | Walters et al. | |

FOREIGN PATENT DOCUMENTS

| | | |
|---|---|---|
| EP | 0836162 A2 | 4/1998 |
| EP | 0856824 A2 | 8/1998 |
| EP | 3076354 A1 | 10/2016 |
| FR | 2586840 A1 | 9/1985 |
| GB | 2404768 A | 2/2005 |
| JP | H01287775 A | 5/1988 |
| KR | 10/2010/0027839 A | 3/2010 |
| KR | 10/2010/0061628 A | 6/2010 |
| WO | 01/06470 A1 | 1/2001 |
| WO | 2004/013819 A1 | 2/2004 |
| WO | 2005/041140 A1 | 5/2005 |
| WO | 2005/043428 A1 | 5/2005 |
| WO | 2005/081192 A1 | 9/2005 |
| WO | 2015/031264 A1 | 3/2015 |

OTHER PUBLICATIONS

"TCP Selective Acknowledgement Options," http://www.sanface.com/txt2pdf.html, dated Oct. 1996.
Search Report and Application No. GB0318689.7, dated Dec. 2, 2003.
Search Report and Application No. EP16162558, dated May 9, 2016.
Search Report and Application No. PCT/US2014/052541, dated Dec. 3, 2014.
Search Report and Application No. PCT/GB2004/002428, dated Sep. 20, 2004.
Search Report and Application No. PCT/GB2005/000495, dated Jun. 10, 2005.
Search Report and Application No. PCT/GB2017/053495, dated May 7, 2018.

* cited by examiner

METHOD OF REMOTE RECONCILIATION OF DATA FROM AN INTELLIGENT CASH HOLDING UNIT AND APPARATUS FOR USE IN SUCH A METHOD

TECHNICAL FIELD OF THE INVENTION

The present invention relates to intelligent cash holding units and methods of reconciling data from intelligent cash holding units with data from associated Electronic Point Of Sale devices (EPOSs), which record transactions. In particular it relates to methods of reconciling data at a remote location, optionally in "the cloud" (which is also known as an "Internet Area Network" (IAN)). The invention relates especially, although not exclusively to intelligent cash drawer units (including flip-top and sliding drawer intelligent cash drawer units), but could also be used with an intelligent point of sale safe, hence the expression intelligent cash holding unit.

BACKGROUND TO THE INVENTION

An intelligent cash drawer unit is a cash drawer unit which contains coins and notes in compartments called cups (obviously tokens, vouchers, or the like could also be contained in the cups, but generally speaking they are used for cash, hence the expression "cash drawer unit"). Unlike a conventional cash drawer, an intelligent cash drawer has cash counting apparatus as the individual cups are augmented with technology that allows them to be weighed. A transducer underneath each cup reads out a continuous analogue signal that represents the weight of the cup and its contents. This analogue signal is digitized and passed to a signal processor which can compute the weight of the cash contained in the cup. By dividing the weight of the contents of the cup by the known weight of a single coin or note of the appropriate denomination the quantity of notes or coins is computed.

A specific example of such a transducer is a 'load-cell' which changes its electrical resistance in response to the amount of weight placed upon it.

Intelligent cash drawers may be provided as separate cash drawer units with sliding cash drawers or with flip top lids which reveal the cash drawer, for use with associated EPOS devices, or can be integrated into cash registers. This invention concerns the former.

An intelligent point of sale safe is a safe with a note acceptor which validates that currency input is genuine and rejects counterfeits. An intelligent point of sale safe also comprises cash counting apparatus as a processor in the safe records the value and number of each note that it input into it (deducts any which are output) and stores a denominational breakdown of its contents. Like an intelligent cash drawer unit, an intelligent point of sale safe may be associated with an EPOS device so that for any given transaction, the cash received and/or disbursed by the intelligent point of sale safe can be reconciled with the cash that should have been received and/or disbursed in accordance with that received from a customer in payment (as calculated by the EPOS).

Typically, there is a local connection between an intelligent cash holding unit and an associated EPOS, for example in a supermarket each EPOS may be locally connected to a cash drawer and a local area network may be provided, by which each EPOS communicates to a local management terminal. This arrangement allows each EPOS to send data concerning the transactions and the contents of the cash drawer to the local management terminal which may conduct statistical analysis based on the results and bring any errors (such as missing cash) to a store manager's attention. In other arrangements, cash drawers may be independently connected to the local area network and capable of transmitting their data to the local management terminal independently of the associated EPOS. In such instances, the management terminal is programmed when the store is set up to know which EPOS is associated with which cash drawer (e.g. identified based on the lane number in-store) and the local management terminal is therefore capable of reconciling data received from the intelligent cash drawers with data from the associated EPOS.

An object of the invention is to provide a method of remotely reconciling data from an intelligent cash holding unit with data from an associated EPOS and an intelligent cash holding unit for use in such a method.

SUMMARY OF THE INVENTION

According to a first aspect of the invention there is provided an intelligent cash holding unit comprising cash counting apparatus; the intelligent cash holding apparatus comprising a controller and memory, the controller being operable to determine an indication of the cash held in the cash holding unit and operable to transmit the indication of the cash held in the cash holding unit to a remote management terminal via a Wide Area Network (WAN) or Internet Area Network (IAN); wherein the controller is operable to store in memory indications of the cash held in the intelligent cash holding unit that are transmitted to the remote management terminal and operable, in response to a request signal, to transmit (or retransmit) one or more indications stored in memory.

Such an arrangement means that if data is lost on its way to the remote management terminal, for example because of a server failure, power failure or other interruption, a request can be made to the intelligent cash holding unit and the missing data can be obtained and reconciled with data from an associated EPOS. The possibility for data to be lost has been a barrier preventing cloud-based reconciliation of data from an intelligent cash holding device with that of its associated EPOS; this has required hard-wired connections between each EPOS and its associated intelligent cash holding device (and suitable programming such that the EPOS can interpret signals from the intelligent cash holding device), or the provision of a dedicated local in-store management terminal. Of course, a dedicated local management terminal may be provided in addition to the remote management terminal and may conduct analysis relevant to the local manager, whereas the remote management terminal may carry out analysis more relevant to regional managers or head-office, for example, to identify poorly performing local managers.

Apart from obviating the need for hard-wiring or local management terminals, the ability to reconcile data from an intelligent cash holding unit with that of an associated EPOS at a remote location may have additional benefits, such as increasing redundancy and allowing for off-site data storage.

The remote management terminal may be a virtual or "soft" terminal hosted on the cloud, or may be a hard terminal connected to the wide area network.

The intelligent cash holding unit may be an intelligent cash drawer or may be an intelligent point of sale safe.

The indications of cash held in the unit may be transmitted as an indication of the number of items (e.g. coins or notes) of each denomination held in the unit, an indication of the total value of each denomination, an indication of the total value of all denominations, or (in an intelligent cash drawer unit) the weight of cash in each cup (from which the total number and hence value can be determined), or indeed, the indication could be an indication of the change in the contents after each transaction (e.g. the total value of cash introduced and/or removed, optionally broken down by denomination).

The intelligent cash holding unit may comprise a timing unit, and the controller may be operable to transmit and/or to store the time and optionally the date of each indication of the cash held in the intelligent cash unit.

The timing unit may be a clock and in particular may be a real-time clock. The clock may be provided with an independent power source, such as a battery, in particular a rechargeable battery, so as to maintain time during power outages.

Data transmitted through a WAN or IAN tends to arrive asynchronously, accordingly transmitting the time as well as the indication allows the data from the intelligent cash holding unit to be reconciled with data from an associated EPOS at the same point in time. Storing the time as well as the indication allows missing data to be checked by checking that the time stamp is correct and to be obtained by requesting indications from a certain period in time.

The controller may be operable to transmit and/or store to memory each indication together with a unique sequence number. The sequence numbers may increase consecutively.

The memory may be non-volatile memory, including battery-backed-up ROM or EEPROM and may be arranged to store all indications, or to store a buffer of recent indications. Whilst storing all indications is preferable, the size of memory required can be reduced by storing only recent indications, for example the last 1000. Such a large number should be sufficient even for long-lasting interruptions.

The controller may be operable to transmit and/or store each indication of the cash held in the intelligent cash holding unit each time a new stable reading is available.

Where the intelligent cash holding unit is an intelligent cash drawer, it may comprise a sensor operable to determine when the drawer is closed and the controller may be operable to determine an indication of the cash held in the drawer by determining when the drawer has closed, and then storing and transmitting the next available stable count of the cash. Thus the controller may be operable to transmit and/or store each indication of the cash held in the intelligent cash holding unit after each transaction; each transaction determined by sensing closure of the drawer.

The controller may be operable to transmit and/or store only one indication of cash held in the intelligent cash holding unit only once after each transaction and only once a stable reading is available. This avoids clogging the network or wasting resources at the remote computer dealing with duplicate data.

Each intelligent cash holding unit may comprise a unique identifier (e.g. a unique serial number) which may be stored in memory. The controller may be operable to transmit the unique identifier in each transmission.

The controller may be operable to transmit, in each transmission, the unique identifier, the time (and optionally the date), the sequence number and the denominational breakdown of the contents of the intelligent cash holding unit.

Each intelligent cash holding unit may have an IP address. This allows requests from the remote computer to be sent to the intelligent cash holding unit via standard TCP/IP protocols.

The controller may be operable to store to memory the address, for example the IP address of the remote management terminal. The controller may be operable to address data packets comprising the indications to the remote management terminal.

In a second aspect of the invention there is provided a method of operating an intelligent cash holding unit in communication with a remote management terminal via a Wide Area Network (WAN) or Internet Area Network (IAN); the method comprising determining an indication of the cash held in the cash holding unit; transmitting the indication of the cash held in the cash holding unit to the remote management terminal; storing indications of the cash held in the intelligent cash holding unit that are transmitted to the remote management terminal; and, in response to receiving a request signal to transmit one or more stored indications, transmitting (or re-transmitting) one or more stored indications to the remote management terminal.

The indications may be transmitted to a remote management terminal in the form of a virtual terminal hosted on the cloud, or a hard terminal connected to the wide area network. The indications may be transmitted directly to the remote management terminal, or via a local management terminal.

The method may transmit indications of cash held in the unit as an indication of the number of items (e.g. coins or notes) of each denomination held in the unit, an indication of the total value of each denomination, an indication of the total value of all denominations, or (in an intelligent cash drawer unit) the weight of cash in each cup (from which the total number and hence value can be determined), or indeed, the indication could be an indication of the change in the contents after each transaction (e.g. the total value of cash introduced and/or removed optionally broken down by denomination).

The method may comprise transmitting and/or storing the time and optionally the date of each indication of the cash held in the intelligent cash unit.

The method may comprise transmitting and/or storing to memory each indication together with a unique sequence number. The method may increment each sequence number consecutively after each transmission.

The method may comprising storing all indications, or storing a buffer of recent indications and overwriting old indications.

The method may comprise transmitting and/or storing each indication of the cash held in the intelligent cash holding unit each time a new stable reading is available.

Where the intelligent cash holding unit is an intelligent cash drawer, the method may comprise determining when the drawer is closed, then storing and transmitting the next available stable count of the cash. Thus the controller may be operable to transmit and/or store each indication of the cash held in the intelligent cash holding unit after each transaction.

The method may comprise transmitting and/or storing only one indication of cash held in the drawer only once after each transaction and only once a stable reading is available.

The method may comprise transmitting a unique identifier (e.g. a unique serial number) for the intelligent cash holding unit in each transmission.

The method may comprise transmitting, in each transmission, the unique identifier, the time (and optionally the date), the sequence number and the denominational breakdown of the contents of the intelligent cash holding unit.

The method may be conducted by intelligent cash holding unit according to the first aspect of the invention, including any of the optional features thereof and any combination of optional features thereof.

According to a third aspect of the invention there is provided a method of remotely reconciling data from a plurality of Electronic Point Of Sale devices (EPOSs) and a plurality of intelligent cash holding units associated with the plurality of EPOSs; the method comprising:

receiving data packets from a first EPOS of the plurality of EPOSs via a WAN or IAN;

receiving data packets from a first intelligent cash holding unit of the plurality of intelligent cash holding units via a WAN or IAN, the first intelligent cash holding unit being associated with the first EPOS;

storing information associating the first intelligent cash holding unit with its associated first EPOS; and comparing data packets received from the first EPOS and data packets received from the first intelligent cash holding unit;

and where it is determined that data is missing from the first intelligent cash holding apparatus, transmitting a request to the first intelligent cash holding apparatus to transmit or retransmit missing data packets.

The method may further comprise comparing data packets received from the first EPOS and data packets received from the first intelligent cash holding unit and where it is determined that data is missing from the first EPOS, transmitting a request to the first EPOS to transmit or retransmit missing data packets.

The method may comprise receiving data packets from the first intelligent cash holding unit comprising a unique ID number and receiving data packets from the associated first EPOS with an identifier and storing information associating the first EPOS and the first intelligent cash holding unit based on the unique ID number of the first intelligent cash holding unit and the identifier of the first EPOS. For example, the identifier of the EPOS may be made up of an ID for the store it is provided in, combined with an ID for the lane in the store in which it is arranged and/or a similar unique ID number, such as a serial number.

The method may comprise receiving data packets from the first intelligent cash holding unit including a sequence number and storing data packets with the sequence numbers.

The method may comprise receiving a further data packet including a sequence number from the first intelligent cash holding unit and comparing the data received with stored data, and where the sequence number for that first intelligent cash holding unit is not consecutive with the stored data packets and data packets including one or more sequence numbers have not been stored, transmitting a request to that first intelligent cash holding unit to transmit or retransmit data packets with the missing sequence number (or missing sequence numbers).

The method may comprise receiving data packets comprising a time and optionally a date from the first intelligent cash holding unit and receiving data packets comprising a time and optionally a date from the associated first EPOS and comparing data from the first intelligent cash holding unit with data from the associated first EPOS to determine whether the cash in the cash holding unit accords with the cash that should be in the first cash holding unit based on data concerning transactions recorded by the first EPOS at corresponding times.

The method may comprise receiving data packets from the first intelligent cash holding unit comprising indications of cash held in the unit. The indication of cash held in the unit may be an indication of the number of items (e.g. coins or notes) of each denomination held in the unit, an indication of the total value of each denomination, an indication of the total value of all denominations, or (where the intelligent cash holding unit is an intelligent cash drawer unit) the weight of cash in each cup (from which the total number and hence value can be determined), or indeed, the indication could be an indication of the change in the contents after each transaction (e.g. the total value of cash introduced and/or removed optionally broken down by denomination).

The method may comprise storing an IP address of the first intelligent cash holding unit and optionally the first EPOS. The method may comprise addressing a request to the first EPOS or the first intelligent cash holding apparatus then transmitting the request to the first EPOS or the first intelligent cash holding apparatus to transmit or retransmit missing data packets.

The method may comprise synchronising the clocks of the first intelligent cash holding unit and the first EPOS. The method of synchronisation may be by sending a request for the current time according to a clock in the EPOS to the EPOS, receiving an indication of current time at the EPOS and transmitting a set-time command to the intelligent cash holding unit to set the time at the intelligent cash holding unit to that of the EPOS (or vice versa). Whilst a certain amount of delay may be introduced by this method, with time passing between the EPOS sending current time and that time being set as current at the intelligent cash holding unit, the delay will normally be less than one second, transactions will normally be many seconds, if not minutes apart, so that level of synchronisation will be sufficient.

The method may further comprise:

receiving data packets from a second and optionally further EPOSs of the plurality of EPOSs via a WAN or IAN;

receiving data packets from a second and optionally further intelligent cash holding units of the plurality of intelligent cash holding units via a WAN or IAN, the second intelligent cash holding unit being associated with the second EPOS and optional further intelligent cash holding units being associated with respective optional further EPOS s;

storing information associating the second intelligent cash holding unit with its associated second EPOS; and optionally storing information associating the optional further intelligent cash holding units with respective associated EPOSs comparing data packets received from the second EPOS and data packets received from the second intelligent cash holding unit;

optionally comparing data packets received from the optional further EPOSs and data packets received from respective optional further intelligent cash holding units;

and where it is determined that data is missing from one of the intelligent cash holding apparatus, transmitting a request to the respective intelligent cash holding apparatus to transmit or retransmit missing data packets.

The method may further comprise where it is determined that data is missing from one of the EPOSs, transmitting a request to the respective EPOS to transmit or retransmit missing data packets.

The method may comprise receiving data packets from the each intelligent cash holding unit comprising a unique ID number and receiving data packets from each EPOS with an identifier and storing information associating the respective EPOS with the respective associated intelligent cash holding unit based on the unique ID number of each intelligent cash holding unit and the identifier of each EPOS. For example, the identifier of the EPOS may be made up of an ID for the store it is provided in, combined with an ID for the lane in the store in which it is arranged and/or a similar unique ID number, such as a serial number.

The method may comprise receiving data packets from each intelligent cash holding unit including a sequence number and storing data packets with the sequence numbers.

The method may comprise receiving a further data packet including a sequence number from each intelligent cash holding unit and comparing the data received with stored data for the respective intelligent cash holding unit, and where the sequence number for a respective intelligent cash holding unit is not consecutive with the stored data packets and data packets including one or more sequence numbers have not been stored, transmitting a request to that respective intelligent cash holding unit to transmit or retransmit data packets with the missing sequence number (or missing sequence numbers).

The method may comprise receiving data packets comprising a time and optionally a date from each intelligent cash holding unit and receiving data packets comprising a time and optionally a date from each associated first EPOS and comparing data from each respective intelligent cash holding unit with data from each respective associated EPOS to determine whether the cash in the respective cash holding unit accords with the cash that should be in the respective cash holding unit based on data concerning transactions recorded by the respective associated EPOS at corresponding times.

The method may comprise receiving data packets from each intelligent cash holding unit comprising indications of cash held in the respective unit. The indication of cash held in the unit may be an indication of the number of items (e.g. coins or notes) of each denomination held in the unit, an indication of the total value of each denomination, an indication of the total value of all denominations, or (where the intelligent cash holding unit is an intelligent cash drawer unit) the weight of cash in each cup (from which the total number and hence value can be determined), or indeed, the indication could be an indication of the change in the contents after each transaction (e.g. the total value of cash introduced and/or removed optionally broken down by denomination).

The method may comprise storing an IP address of each intelligent cash holding unit and optionally each EPOS. The method may comprise addressing a request to the respective EPOS or the respective intelligent cash holding apparatus then transmitting the request to the respective EPOS or the respective intelligent cash holding apparatus to transmit or retransmit missing data packets.

The method may comprise synchronising the clocks of each intelligent cash holding unit and each associated EPOS. The method of synchronisation may be by sending a request for the current time according to a clock in the respective EPOS to the respective EPOS, receiving an indication of current time at the respective EPOS and transmitting a set-time command to the respective associated intelligent cash holding unit to set the time at the respective associated intelligent cash holding unit (or vice versa).

In a fourth aspect of the invention, there is provided a remote management terminal operable to carry out the method of remote reconciliation as set out above (optionally including any optional feature or combination of optional features).

In any aspect of the invention, the or each intelligent cash holding unit may be an intelligent cash drawer unit having an openable cash drawer comprising a plurality of cups supported on a plurality of transducers operable to weigh the cups, a signal processor operable to process signals received from the transducers to determine the value of cash in the cups, and a sensor operable to detect whether the drawer is open or closed.

The sensor operable to detect whether the drawer is open or closed may be a micro-switch.

The intelligent cash drawer unit may comprise a plurality of note cups and coin cups arranged on respective load cells comprising transducers. For example, the load cells may be strain gauge load cells.

The intelligent cash drawer unit may comprise a flip-lid cash drawer unit, or an intelligent cash drawer unit comprising a sliding drawer.

DETAILED DESCRIPTION OF THE INVENTION

In order that the invention may be more clearly understood an embodiment thereof will now be described, by way of example only, with reference to the accompanying drawings, of which:

Figure 1:
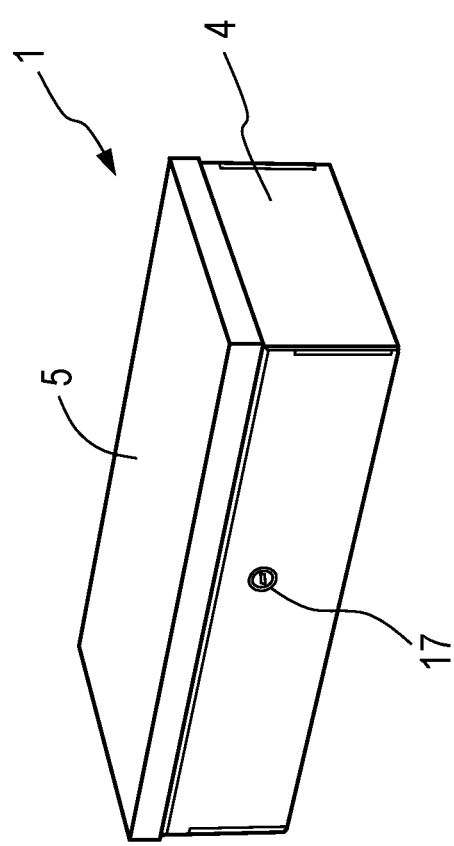
FIG. 1 shows perspective view of an intelligent cash holding unit according to an embodiment of the invention in the closed state.
Figure 2:
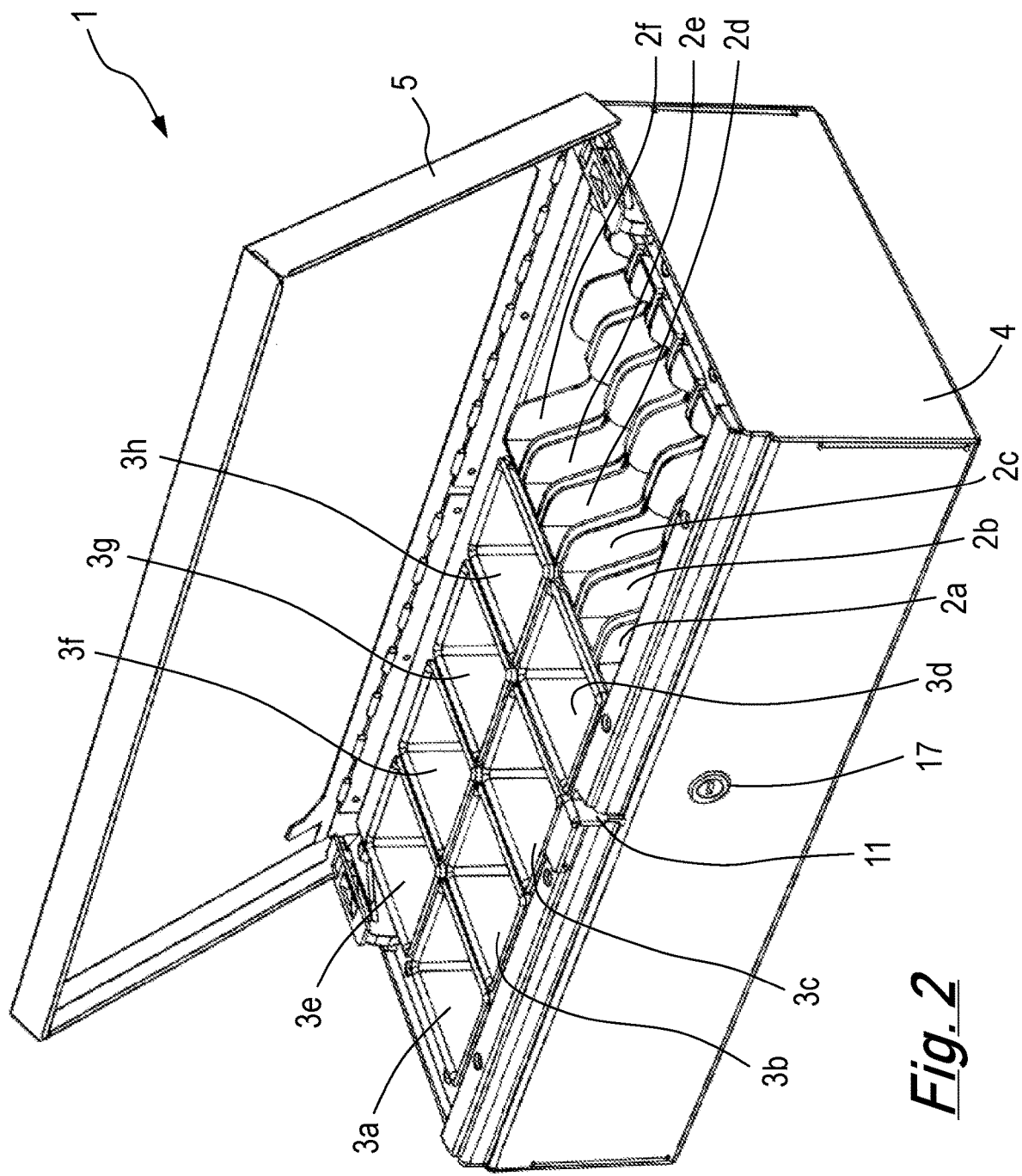
FIG. 2 shows a perspective view of the intelligent cash holding unit of FIG. 1 in the open state.

With reference to the figures, in particular FIGS. 1 and 2, an intelligent cash holding unit in the form of an intelligent cash drawer unit 1 is provided with a number of note cups 2a, 2b, 2c, 2d, 2e, 2f (together 2), and coin-cups 3a, 3b, 3c, 3d, 3e, 3f, 3g, 3h (together 3) arranged within a housing 4. The intelligent cash drawer unit is of the "flip-top" type and comprises a lid 5 hingedly attached to the rear of the housing 4 and arranged to close the top of the housing 4. The intelligent cash drawer unit 1 is intended for use with a separate EPOS (not shown in FIGS. 1-3). Of course, those skilled in the art will appreciate that the intelligent cash holding unit could be an intelligent cash drawer unit of the "sliding drawer" type, well known to those skilled in the art, or indeed an intelligent safe.

As is typical, the intelligent cash drawer unit 1 of this embodiment is cuboid, with a long front and shorter sides. The note cups 2 are so-called "vertical" note cups. These vertical note cups 2 are intended and designed to receive notes with their plane substantially vertical, having their long axes horizontal and their short axes vertical. Consequently, the vertical note cups 2 are taller than they are wide and longer than they are tall. The vertical note cups 2 all have their long axes extending parallel to the front and rear of the intelligent cash drawer unit 1 and are arranged in the right hand side of the housing 4, one behind another. They are each intended to receive a specific denomination of note and may be provided with indicia indicating the note they are intended to receive.

The coin cups 3 are intended and designed to receive coins. They are arranged to the left of the note cups 2, in two rows of four, one row behind the other. The coin cups are intended to each receive a specific denomination of coin and may also be provided with indicia showing the denomination they are intended to receive.

The housing 4 and lid 5 of the cash drawer 1 of this embodiment of the invention is in metal, but of course other suitable materials are available (metal has the advantage of shielding components (e.g. load cells, ADC and other circuitry discussed below from electrical noise). The cups 2, 3 in this embodiment are formed from ABS plastic material, e.g. by injection moulding, but of course, other plastics materials, or even other different non-plastics materials could be used.

Figure 3:
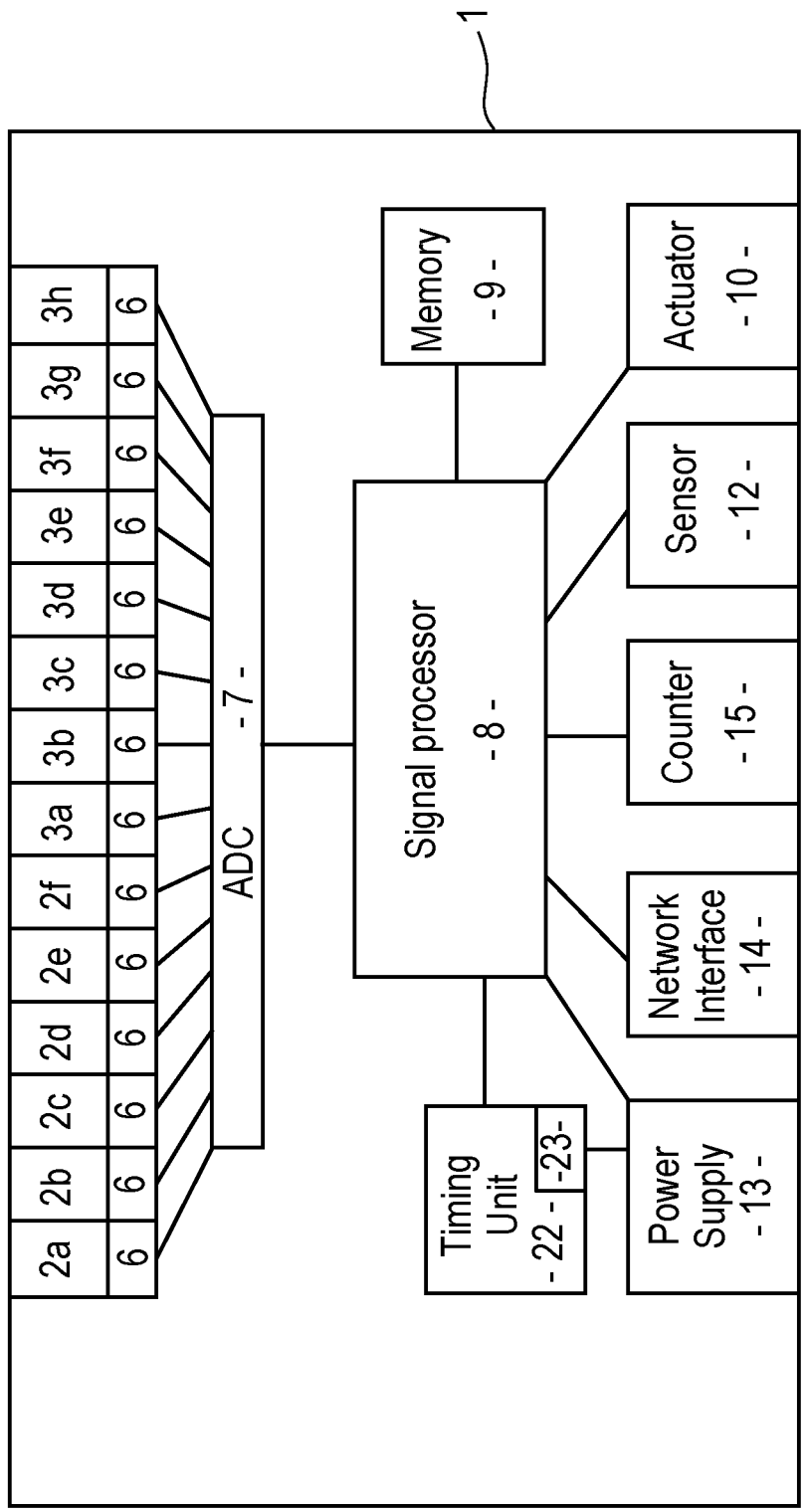
FIG. 3 shows a schematic electrical diagram of the intelligent cash holding unit of FIGS. 1 and 2.

As shown schematically in FIG. 3, each cup 2, 3 is supported on a load cell 6 (not visible in FIGS. 1 and 2), in the form of conventional strain gauge load cells 6 which each comprise a transducer which outputs an analogue electrical signal which varies according to the weight on the load cell 6 to an analogue-digital converter (ADC) 7.

The ADC 7 is connected to a signal processor, or controller, 8 which in turn is connected to a memory component 9, an actuator 10 (to actuate the latch mechanism 11 shown in FIG. 2 and open the lid 5), a sensor 12 in the form of a micro-switch, arranged to detect opening/closing of the lid 5) a power supply 13, a network interface 14, and a timing unit 22, in the form of a real-time clock comprising a back-up battery 23, which is rechargeable from the power supply 13 in order that the timing unit 22 is capable of maintaining time during power outages. The controller is also connected to a counter 15.

Figure 4:
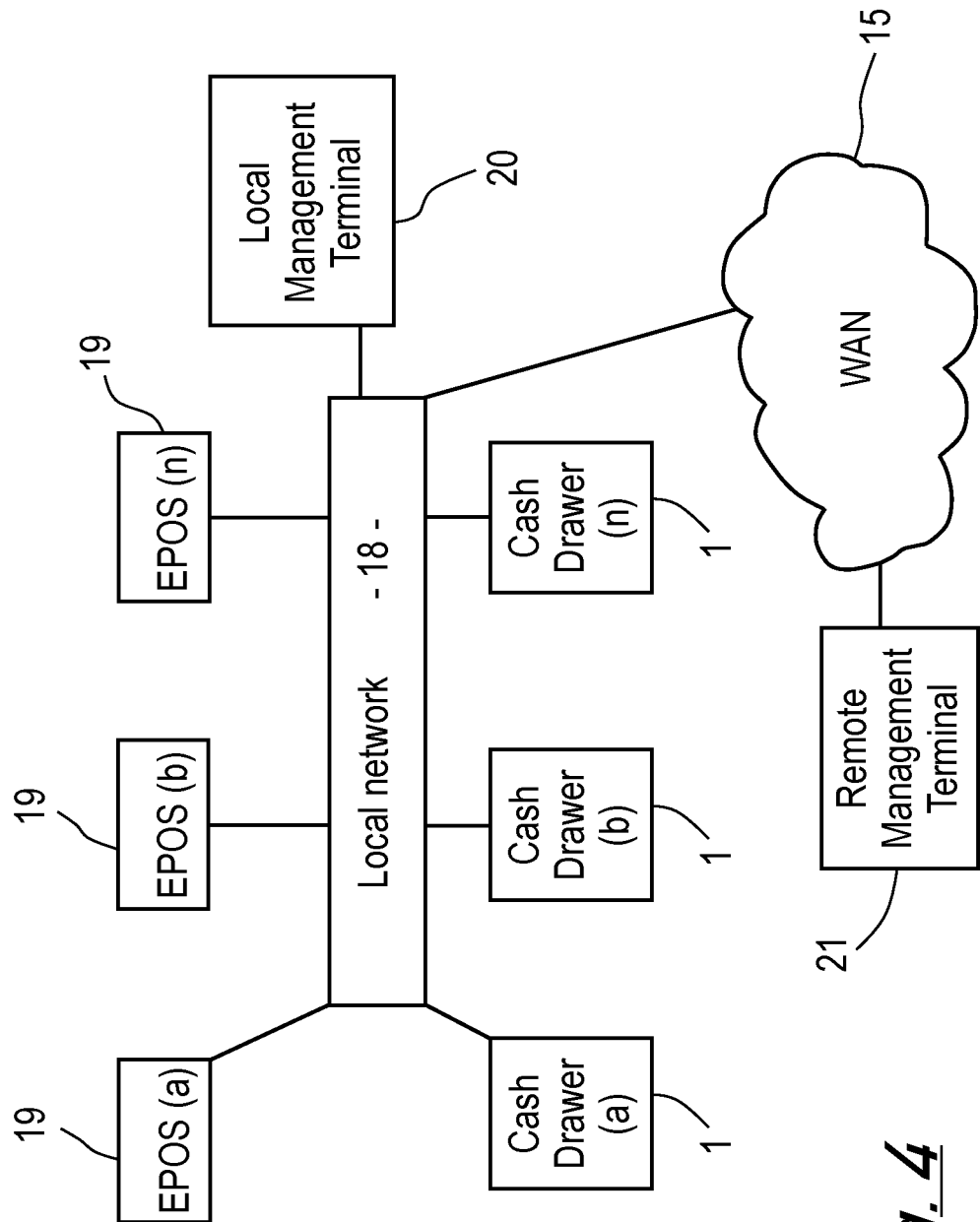
FIG. 4 shows a schematic diagram of a network comprising a plurality of intelligent cash holding units according to FIGS. 1-3.
Figure 5:
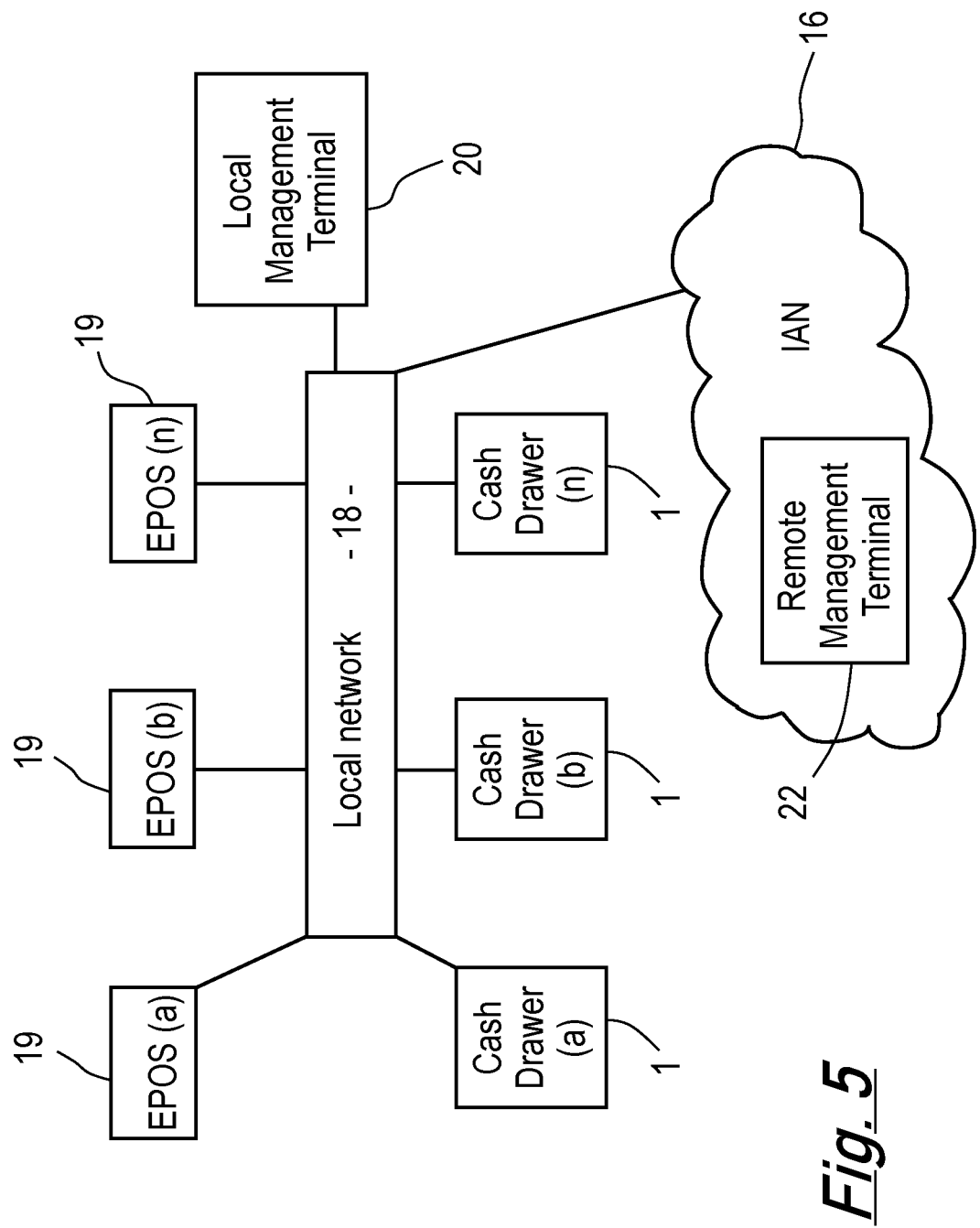
FIG. 5 shows a schematic diagram of an alternative network arrangement comprising a plurality of intelligent cash holding units according to FIGS. 1-3.

The network interface 14 is a communications bus and comprises a transceiver to transmit data to and receive data via a Local Area Network (LAN) 18 (e.g. Ethernet or Wi-Fi), to a Wide Area Network (WAN) 15 or Internet Area Network (IAN) 16 as shown in FIGS. 4 and 5 respectively. In this way it can communicate with a remote management terminal 21, 22, which may be a server or local computer 21 in a remote location connected to the WAN 15, or a virtual terminal 22 formed in the "cloud" or IAN 16. The network interface 14 may additionally allow the intelligent cash drawer unit 1 to communicate with other terminals via the LAN 18, such as a separate associated EPOS 19 and/or a local management terminal 20 shown schematically in FIGS. 4 and 5.

The micro-switch 12 is arranged to be closed by closure of the lid 5, such that it registers opening as soon as the lid 5 starts to open The actuator 10 of this embodiment is a solenoid arranged to unlatch the latch mechanism 11. Also visible in FIG. 1 is the keyhole of a lock 17, to manually open the intelligent cash drawer unit 1.

The controller 8 controls the operations of the intelligent cash drawer unit 1, based on instructions stored in software in memory 9.

Memory 9, in addition to storing the software on the basis of which the signal processor 8 controls the intelligent cash drawer unit 1, is also operable on instruction from the signal processor 8 to store data, including data from the transducers and data including the unique ID or serial number of the intelligent cash drawer unit 1, used to identify the intelligent cash drawer unit 1 when reporting to the remote management terminal 21, 22. Memory 9 comprises non-volatile memory (such as a hard disc, flash memory, EEPROM or battery backed RAM) in order to store information even in the event of loss of power.

Typically, the intelligent cash drawer unit 1 receives an "open" signal sent by an associated EPOS 19 once the value of a transaction has been calculated. In response to the open signal, the controller 8 activates the actuator 10 to undo the latch mechanism 11 so that the lid 5 opens. The cashier will then introduce cash that has been received and optionally take out change (or take out "cash-back" for a customer), then close the lid 5.

According to this embodiment of the invention, the controller 8 is operable (in accordance with the operating system stored in memory 9) to process signals from the transducers of the load cells 6 each time that the sensor 12 detects that the drawer has been closed and to determine the weight of cash in the cups (2, 3), in order to calculate the value of the contents of the intelligent cash drawer unit 1, in terms of the number of items of each denomination in the intelligent cash drawer unit 1. Using known algorithms, the controller 8 will process signals from the load cells until a stable reading is obtained, i.e. once readings have settled.

Having calculated the number of items of each denomination, the controller 8 of the intelligent cash drawer unit 1 is operable to transmit a data packet with an indication of the contents to the remote management terminal 21, 22.

The indication of cash held in the unit may be an indication of the number of items (e.g. coins or notes) of each denomination held in the unit, an indication of the total value of each denomination, an indication of the total value of all denominations, or (where the intelligent cash holding unit 1 is an intelligent cash drawer unit) the weight of cash in each cup (from which the total number and hence value can be determined), or indeed, the indication could be an indication of the change in the contents after each transaction (e.g. the total value of cash introduced and/or removed optionally broken down by denomination). In this embodiment, the indication is a breakdown of the number of items of each denomination held in the unit.

The controller 8 is also operable to store each indication in memory 9 and operable to maintain a count, incrementing a counter 15 each time that the drawer is closed and the weight is determined, and storing the count as a sequence number together with the indication of the contents of the cups 2,3.

The controller 8 is further operable to store the time and date of each indication of the contents of the drawer in a database in memory 9, together with the corresponding sequence number and indication of the contents of the intelligent cash holding unit 1.

All of this information is also sent to the remote terminal 21, 22 (for example via a TCP/IP protocol addressing the remote terminal by its IP address, which during setup is stored to the memory 9). The controller 8 is operable, each time the drawer is closed to transmit a data packet to the remote terminal, each data packet including (a) the serial number of the intelligent cash drawer unit 1, (b) the time and date (c) the sequence number and (d) the denominational breakdown of the contents of the drawer.

The time and date, the sequence number and the denominational breakdown of the contents of the drawer may be stored as a buffer, i.e. the earliest data may be overwritten periodically, for example as memory 9 becomes full. Alternatively, the data may not be overwritten, but stored indefinitely (obviously depending on the capacity of the memory 9).

With reference to FIG. 4, a remote terminal 21, which may be located in a head-office monitors a plurality of intelligent cash drawer units 1; a first intelligent cash drawer unit 1a, a second intelligent cash drawer unit 1b, and further cash drawer units 1n (each composed and operable as set out above) and a plurality of EPOSs; a first EPOS 19a, a second EPOS 19b, and further EPOSs 19n that are arranged in a store (e.g. a supermarket) and connected to a local area network 18. The remote terminal 21 is connected to the local area network 18 via a wide area network 15, for example over the internet. The remote terminal 21 is arranged to monitor a plurality of intelligent cash drawer units 1a, 1b, 1n and EPOSs 19a, 19b, 19n in a number of stores, but for simplicity, only one is shown.

The first intelligent cash drawer unit 1a is associated with the first EPOS 19a; it is located next to that EPOS 19a and receives the "open" signal from it, storing cash that is received and/or dispensed for each transaction recorded by the first EPOS 19a.

Similarly, the second cash drawer unit 1b is associated with the second EPOS 19b and operates in tandem with it, opening in response to a signal from it and storing cash received or dispensed in accordance with each transaction. Likewise further intelligent cash drawer units 1n are associated with respective further EPOSs 19n.

Each EPOS 19a-n, as is conventional, is arranged to transmit data in relation to each transaction to the local management terminal 20. The local management terminal is arranged to transmit that data to the remote management terminal 21 via the WAN 15, including an indicator of which EPOS 19a-n it relates to.

Each intelligent cash drawer unit 1a-1n also sends a data packet in relation to each transaction, as set out above, each data packet, sent each time the drawer is closed includes (a) the serial number of the respective intelligent cash drawer unit 1a-n, (b) the time and date (c) the sequence number and (d) the denominational breakdown of the contents of the drawer.

The remote terminal 21 stores in a database the associations between the first intelligent cash drawer unit 1a and the first EPOS 19a, the second intelligent cash drawer unit 1b and the second EPOS 19a and respective further intelligent cash drawer units 1n and EPOSs 19n, based on the unique ID numbers of the intelligent cash drawers 1a-n and the identifier of the first EPOS, which may be made up of an ID for the store it is provided in, combined with an ID for the lane in the store in which it is arranged and/or a similar unique ID number, such as a serial number.

The remote terminal 21 additionally stores the addresses of the intelligent cash drawer units 1a, 1b, 1n (e.g. IP addresses), in order that it can transmit request commands to the intelligent cash drawer units 1a, 1b, 1n.

Data from the EPOSs 19a-19n and data from the intelligent cash drawer units 1a-1n will arrive at the remote management terminal asynchronously, because different data packets will follow different routes. In the event of power failure or network failure, data packets from the EPOSs 19a-19n, and/or the intelligent cash drawer units 1a-1n will not arrive at the remote terminal 21.

However, provided data from the EPOSs 19a-19n includes a time stamp (which is normal practice), the remote terminal 21 can reconcile data from each intelligent cash drawer 1a-1n with its respective EPOS 19a-n, based on corresponding times at which the data was sent.

It will be appreciated that "corresponding" times will not normally be exactly the same, because data from the EPOS 19a-n concerning a transaction may be available before the cash is introduced into the respective intelligent cash drawer unit 1a-n, and a certain amount of time is taken after cash is introduced to calculate the value of cash introduced. This is particularly the case because the calculation of the value of cash in the apparatus only take places after the cash has been introduced and the drawer has been closed. There may also be a delay waiting for the result to become stable. Fortunately, this delay is normally measured in seconds rather than minutes (e.g. around 2-20 seconds), and in any case, it is straightforward to determine which EPOS 19a-n transaction corresponds to the data from the intelligent cash holding apparatus 1a-n, since the time stamp of the data packet from the intelligent cash holding apparatus 1a-n will always be later than the time stamp for the corresponding transaction on the EPOS 19a-n, but earlier than the time stamp of the next data packet from the EPOS 19a-n (from the subsequent transaction).

A certain amount of synchronisation is required to make sure that the clock on the EPOS 19a-n and that on the respective associated cash drawer 1a-n does not become too far out of synch (e.g. more than 10 seconds), so from time to time, e.g. daily the remote management terminal 21 may send a request for the current time according to a clock (not shown) in the EPOS 19a-n to the EPOS 19a-n, receiving an indication of current time at the EPOS 19a-n and transmitting a set-time command to the respective associated intelligent cash holding unit 1a-n to set the time at the intelligent cash holding unit (or vice versa).

The remote management terminal 21 as set out above, receives and reconciles data from respective EPOSs 19a-n and their respective cash drawers 1a-n, matching up sets of transactions, using the serial number of the intelligent cash drawer unit 1a-n to match up against the associated EPOS 19a-n identification and matching specific transactions based on the time (and date) included in the data packets. The data from the intelligent cash drawer unit 1a-1n is then compared with the data from the respective associated EPOS 19a-n for the production of reports and/or sending of alerts in the event of a data mismatch (e.g. apparently missing cash, which may have been stolen).

Additionally, the remote management terminal 21 is arranged to verify that all data packets sent from each intelligent cash drawer unit 1a-1n have been received. To do this, the remote management terminal checks (e.g. periodically) that for each intelligent cash drawer unit 1a-1n there are no gaps in the sequence numbers received from the respective intelligent cash drawer unit 1a-n. Data from the respective intelligent cash drawer units may be stored in a database in sequence number order, and those skilled in the art will readily conceive of suitable algorithms to identify missing numbers in a list that if correct is consecutive.

Where a missing data packet is identified, the remote management terminal 21 is operable to send a request for certain particular data, identified by sequence number to the relevant intelligent cash drawer unit 1a-n, from which data was found to be missing. This request is sent via WAN, to the LAN and addresses the relevant intelligent cash drawer unit 1a-n by its IP address. In response, the controller 8 of the relevant intelligent cash drawer unit 1a-n operates to retrieve the missing information from memory 9, form a data packet including (a) the serial number of the intelligent cash drawer unit 1, (b) the sequence number (c) the denominational breakdown of the contents of the drawer stored with that sequence number and (d) the time and date of that sequence number.

An alternative embodiment of a network, in which the method is carried out is shown in FIG. 5. In the embodiment of FIG. 5, the intelligent cash drawer units 1a-n, the EPOSs 19a-n, the local area network 18 and the local management terminal are all the same and operate in the same way; the only difference is that rather than a standalone computer in a head-office and connected by WAN 15 to the LAN 18, the remote management terminal 21 is replaced with a virtual remote management terminal 22, which is hosted in the "cloud" or Internet Area Network 16.

In all other respects, the virtual remote management terminal 22 acts exactly as the remote management terminal 21 connected to the WAN 18. Hence it is not described here in any further detail.

The above embodiment is described by way of example only. Many variations are possible without departing from the scope of the invention as defined in the appended claims.

The invention claimed is:

1. A method of remotely reconciling data from a plurality of Electronic Point Of Sale devices (EPOSs) and a plurality of intelligent cash holding units associated with the plurality of EPOSs; the method comprising:
receiving data packets from a first EPOS of the plurality of EPOSs via a Wide Area Network (WAN) or an Internet Area Network (IAN);
receiving data packets from a first intelligent cash holding unit of the plurality of intelligent cash holding units via the WAN or the IAN, the first intelligent cash holding unit being associated with the first EPOS, each data packet including a sequence number;
storing data from the data packets with the sequence numbers;
storing information associating the first intelligent cash holding unit with the first EPOS; and
comparing the data packets received from the first EPOS and the data packets received from the first intelligent cash holding unit; and
when it is determined that data is missing from the first intelligent cash holding unit, transmitting a request to the first intelligent cash holding unit to transmit or retransmit missing data packets;
the method further comprising receiving a further data packet including a sequence number from the first intelligent cash holding unit and comparing data in the further data packet received with stored data, and where the sequence number for the first intelligent cash holding unit is not consecutive with the stored data packets and data packets including one or more sequence numbers have not been stored, transmitting a request to the first intelligent cash holding unit to transmit or retransmit data packets with the missing sequence number or missing sequence numbers.

2. A method of remotely reconciling data according to claim 1 comprising receiving data packets from the first intelligent cash holding unit comprising a unique ID number and receiving data packets from the associated first EPOS with an identifier and storing information associating the first EPOS and the first intelligent cash holding unit based on the unique ID number of the first intelligent cash holding unit and the identifier of the first EPOS.

3. A method of remotely reconciling data according to claim 1 comprising receiving data packets from the first intelligent cash holding unit comprising indications of cash held in the first intelligent cash holding unit.

4. A method of remotely reconciling data according to claim 1 comprising synchronising clocks in the first intelligent cash holding unit and the first EPOS by sending a request for a current time according to a clock in the EPOS to the EPOS, receiving an indication of the current time at the EPOS and transmitting a set-time command to the intelligent cash holding unit to set the time at the intelligent cash holding unit to that of the EPOS.

5. A method of reconciling data according to claim 1 further comprising receiving data packets from a second EPOS of the plurality of EPOSs via the WAN or the IAN; receiving data packets from a second intelligent cash holding unit of the plurality of intelligent cash holding units via the WAN or the IAN, the second intelligent cash holding unit being associated with the second EPOS;
storing information associating the second intelligent cash holding unit with its associated second EPOS; and
comparing data packets received from the second EPOS and data packets received from the second intelligent cash holding unit;
and when it is determined that data is missing from one of the intelligent cash holding units, transmitting a request to the respective intelligent cash holding units to transmit or retransmit missing data packets.

6. A method of remotely reconciling data from a plurality of Electronic Point Of Sale devices (EPOSs) and a plurality of intelligent cash holding units associated with the plurality of EPOSs; the method comprising:
receiving data packets from a first EPOS of the plurality of EPOSs via a Wide Area Network (WAN) or an Internet Area Network (IAN);
receiving data packets from a first intelligent cash holding unit of the plurality of intelligent cash holding units via the WAN or the IAN, the first intelligent cash holding unit being associated with the first EPOS;
storing information associating the first intelligent cash holding unit with its associated first EPOS; and
comparing the data packets received from the first EPOS and the data packets received from the first intelligent cash holding unit;
receiving data packets comprising a time from the first intelligent cash holding unit and receiving data packets comprising a time from the associated first EPOS and comparing data from the first intelligent cash holding unit with data from the associated first EPOS to determine whether the cash in the intelligent cash holding unit accords with the cash that should be in the first intelligent cash holding unit based on data concerning transactions recorded by the first EPOS at corresponding times and
when it is determined that data is missing from the first intelligent cash holding unit, transmitting a request to the first intelligent cash holding unit to transmit or retransmit missing data packets.

7. A method of remotely reconciling data according to claim 6 comprising receiving data packets from the first intelligent cash holding unit comprising a unique ID number and receiving data packets from the associated first EPOS with an identifier and storing information associating the first EPOS and the first intelligent cash holding unit based on the unique ID number of the first intelligent cash holding unit and the identifier of the first EPOS.

8. A method of remotely reconciling data according to claim 6 comprising receiving data packets from the first intelligent cash holding unit comprising indications of cash held in the first intelligent cash holding unit.

9. A method of remotely reconciling data according to claim 6 comprising storing an address of the first intelligent cash holding unit and addressing a request to the first intelligent cash holding apparatus then transmitting the request to the first intelligent cash holding apparatus to transmit or retransmit missing data packets.

10. A method of remotely reconciling data according to claim 6 comprising synchronising clocks in the first intelligent cash holding unit and the first EPOS by sending a request for a current time according to a clock in the EPOS to the EPOS, receiving an indication of the current time at the EPOS and transmitting a set-time command to the intelligent cash holding unit to set the time at the intelligent cash holding unit to that of the EPOS.

11. A method of reconciling data according to claim 6 further comprising receiving data packets from a second EPOS of the plurality of EPOSs via the WAN or the IAN;
receiving data packets from a second intelligent cash holding units of the plurality of intelligent cash holding units via the WAN or the IAN, the second intelligent cash holding unit being associated with the second EPOS;
storing information associating the second intelligent cash holding unit with its associated second EPOS; and
comparing data packets received from the second EPOS and data packets received from the second intelligent cash holding unit;
and when it is determined that data is missing from one of the intelligent cash holding units, transmitting a request to the respective intelligent cash holding units to transmit or retransmit missing data packets.

12. A method of remotely reconciling data from a plurality of Electronic Point Of Sale devices (EPOSs) and a plurality of intelligent cash holding units associated with the plurality of EPOSs; the method comprising:
receiving data packets from a first EPOS of the plurality of EPOSs via a WAN or an IAN;
receiving data packets from a first intelligent cash holding unit of the plurality of intelligent cash holding units via the WAN or the IAN, the first intelligent cash holding unit being associated with the first EPOS;
storing information associating the first intelligent cash holding unit with its associated first EPOS; and
comparing the data packets received from the first EPOS and the data packets received from the first intelligent cash holding unit;
when it is determined that data is missing from the first intelligent cash holding unit, transmitting a request to the first intelligent cash holding unit to transmit or retransmit missing data packets; and
storing an address of the first intelligent cash holding unit and addressing a request to the first intelligent cash holding apparatus then transmitting the request to the first intelligent cash holding apparatus to transmit or retransmit missing data packets;
the method further comprising synchronising clocks in the first intelligent cash holding unit and the first EPOS by sending a request for a current time according to a clock in the EPOS to the EPOS, receiving an indication of the current time at the EPOS and transmitting a set-time command to the intelligent cash holding unit to set the time at the intelligent cash holding unit to that of the EPOS.

13. A method of remotely reconciling data according to claim 12 comprising receiving data packets from the first intelligent cash holding unit comprising a unique ID number and receiving data packets from the associated first EPOS with an identifier and storing information associating the first EPOS and the first intelligent cash holding unit based on the unique ID number of the first intelligent cash holding unit and the identifier of the first EPOS.

14. A method of remotely reconciling data according to claim 12 comprising receiving data packets from the first intelligent cash holding unit comprising indications of cash held in the first intelligent cash holding unit.

15. A method of remotely reconciling data according to claim 12 comprising storing an address of the first intelligent cash holding unit and addressing a request to the first intelligent cash holding apparatus then transmitting the request to the first intelligent cash holding apparatus to transmit or retransmit missing data packets.

16. A method of reconciling data according to claim 12 further comprising receiving data packets from a second EPOS of the plurality of EPOSs via the WAN or the IAN;
receiving data packets from a second intelligent cash holding units of the plurality of intelligent cash holding units via the WAN or the IAN, the second intelligent cash holding unit being associated with the second EPOS;
storing information associating the second intelligent cash holding unit with its associated second EPOS; and
comparing data packets received from the second EPOS and data packets received from the second intelligent cash holding unit;
and when it is determined that data is missing from one of the intelligent cash holding units, transmitting a request to the respective intelligent cash holding units to transmit or retransmit missing data packets.

* * * * *